US011966492B2

(12) United States Patent
Schukai

(10) Patent No.: US 11,966,492 B2
(45) Date of Patent: Apr. 23, 2024

(54) SYSTEMS AND METHODS FOR USE IN DATA COUPLING AMONG DATA STRUCTURES

(71) Applicant: MASTERCARD INTERNATIONAL INCORPORATED, Purchase, NY (US)

(72) Inventor: Robert Schukai, Marietta, GA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 321 days.

(21) Appl. No.: 17/466,767

(22) Filed: Sep. 3, 2021

(65) Prior Publication Data

US 2023/0075552 A1    Mar. 9, 2023

(51) Int. Cl.
*G06F 21/62* (2013.01)
*G06F 21/60* (2013.01)
*G06F 21/64* (2013.01)
*G06N 5/022* (2023.01)

(52) U.S. Cl.
CPC ........ *G06F 21/6245* (2013.01); *G06F 21/602* (2013.01); *G06F 21/64* (2013.01); *G06N 5/022* (2013.01); *G06F 2221/2137* (2013.01); *G06F 2221/2141* (2013.01)

(58) Field of Classification Search
CPC .... G06F 21/6245; G06F 21/602; G06F 21/64; G06F 2221/2141; G06F 2221/2137; G06N 5/022
See application file for complete search history.

(56) References Cited

U.S. PATENT DOCUMENTS

| | | | |
|---|---|---|---|
| 6,314,425 B1 * | 11/2001 | Serbinis | G06Q 10/10 |
| | | | 709/224 |
| 9,135,412 B1 * | 9/2015 | Talvensaari | H04L 41/0816 |
| 9,807,096 B2 * | 10/2017 | Volini | H04L 63/0807 |

(Continued)

FOREIGN PATENT DOCUMENTS

| | | |
|---|---|---|
| CN | 104239397 A | 12/2014 |
| CN | 111428048 A | 7/2020 |

OTHER PUBLICATIONS

NPL Search Terms (Year: 2023).*

*Primary Examiner* — Syed A Zaidi
(74) *Attorney, Agent, or Firm* — Harness, Dickey & Pierce, P.L.C.

(57) ABSTRACT

Systems and methods are provided for coupling data structures in different domains to provide cross-domain data access. One example computer-implemented method includes receiving, from a requestor, an access request including a case type and an indicator of a domain and determining a restriction associated with the domain. The method also includes compiling a first message key specific to the access request and transmitting the first message key to the requestor. The method further includes receiving an information request including a second message key and a query specific to a person, verifying the second message key based on the first message key, and coupling to a data structure in the domain. The method then includes, in response to verifying the second message key, submitting the query from the information request to the coupled data structure and providing a response to the query, from the data structure, to the requestor.

17 Claims, 4 Drawing Sheets

(56) References Cited

U.S. PATENT DOCUMENTS

| | | |
|---|---|---|
| 10,313,460 B2 | 6/2019 | Levi et al. |
| 10,602,094 B1 * | 3/2020 | Longo ............... H04N 21/26606 |
| 10,673,862 B1 * | 6/2020 | Threlkeld ............... G06F 21/62 |
| 11,669,627 B1 * | 6/2023 | Miranda ................. G06F 9/451 |
| | | 726/26 |
| 2011/0321147 A1 * | 12/2011 | Chakra ............... G06F 21/6218 |
| | | 726/9 |
| 2015/0254577 A1 * | 9/2015 | Sullivan ................ G06Q 10/00 |
| | | 705/51 |
| 2016/0110123 A1 | 4/2016 | Vega-Gonzalez |
| 2018/0232445 A1 | 8/2018 | Gomadam et al. |
| 2022/0239483 A1 * | 7/2022 | Sugarev ................ H04L 9/3247 |

* cited by examiner

SYSTEMS AND METHODS FOR USE IN DATA COUPLING AMONG DATA STRUCTURES

FIELD

The present disclosure is generally directed to systems and methods for use in data coupling among data structures and, in particular, to data coupling among data structures in different domains based on message key propagation.

BACKGROUND

This section provides background information related to the present disclosure which is not necessarily prior art.

Data structures are known to exist in different domains, or jurisdictions, wherein the data structures are containers for various information. The information included in the data structures may include, for example, personal identifying information or PII for different individuals. As this type of information is useful in various business objectives, the information is collected and stored in the data structures by various entities. That said, the collection and storage of such information has been more recently regulated, whereby the sharing of the collected information may be restricted. Additionally, individuals associated with the information are further empowered, by regulations, laws or rules (e.g., General Data Protection Regulation (GDPR), etc.), to request certain actions related to such information, whereby the entities that have collected and stored the information are compelled to comply.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Information about users or people is prevalent from various sources across multiple different domains, or jurisdictions. Additionally, laws, rules and regulations exist that inhibit the flow of certain information (e.g., personal identifying information or PII, etc.) between domains, and that also limit ability of entities that have collected such information to subsequently use and/or share the information. At the same time, graphical representations of such information may provide insights into the people represented by the information, and also, potentially, links between the people or the entities associated with the information. These graphical representations of the information, however, may be limited by the above laws, rules or regulations, whereby certain links between the people or the entities may be obscured.

Uniquely, the systems and methods herein provide for coupling (and decoupling) data structures in different domains, consistent with message keys, whereby links or insights between people and entities may be revealed based on information associated with the people and/or collected by the entities. In particular, a requestor may request access to certain information of people based on a use type, domain, etc. An information provider then determines appropriate restrictions associated with the access, and compiles the access restrictions into a message key for the request. In turn, the message key, in various embodiments, is provided to the requestor, which verifies the same. The message key is then submitted with queries from the requestor with regard to the information. In doing so, the message key is verified, and in turn, the information provider couples the data structures from different domains (e.g., containing knowledge graphs associated with the content therein, etc.), as permitted (by the message key) and facilitates responses to the queries. In this manner, information is maintained in its domain (often consistent with domain specific laws, rules and/or regulation), while being linked or coupled to information in different domains. As such, the responses to queries account for broader information, potentially in different domains, whereby enhanced insights may be garnered from the responses to the queries.

Figure 1:
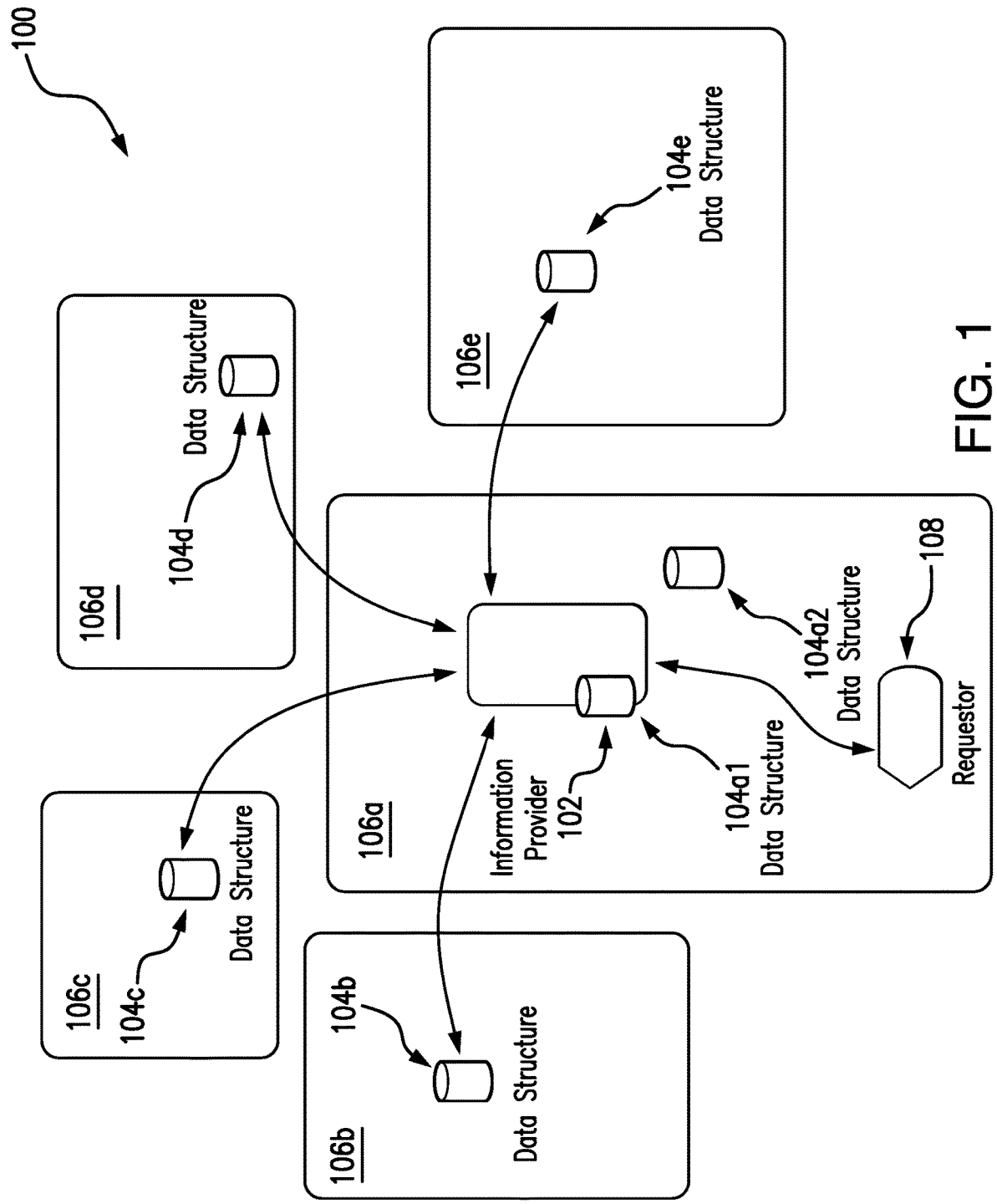
FIG. 1 illustrates an example system of the present disclosure for coupling and decoupling data structures, in different regions or domains, based on message keys.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, different regions included, locations of data structures, information included in the data structures, privacy concerns of the different regions, laws of the different regions, regulations of the different regions, and/or requirements of the different regions, etc.

The illustrated system 100 generally includes an information provider 102, multiple data structures 104a1-e (collectively referred to herein by reference number 104), which are disposed in different regions 106a-e (collectively referred to herein by reference number 106), and a requestor 108. Each of the information provider 102, the data structures 104, and the requestor 108 is coupled to one or more networks, as indicated by the arrowed lines in FIG. 1, to support communication therebetween. The one or more networks may each include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the one or more networks may include multiple different networks, where one or more of the multiple different networks are then accessible to or by particular ones of the information provider 102 and the requestor 108, as well as the data structures 104.

The information provider 102 generally is associated with the assembly of information from the data structures 104. In particular, the information provider 102 is configured to receive a request for data, in one or more forms (e.g., from the requestor 108, etc.), and to provide information, as requested, if permitted by applicable rules, regulations, etc., as described in more detail below. In this example embodiment, the information provider 102 is a standalone party (e.g., an independent service, etc.) located in region 106a. However, in other embodiments, the information provider 102 may be located in one or more other regions, and/or may be incorporated into another party, such as, for example, a payment network, a digital identity provider (IDP), a financial institution, or other related or suitable party, etc. For instance, in one particular example, the information provider 102 may be incorporated, in whole or in part, in the Mastercard® payment network, etc.

The data structures 104 are each generally configured to contain personal identifying information (PII) or data related to one or more different persons. The PII may include, for example, without limitation, a name of a person, an email address, a mailing address, a phone number, a government ID number (e.g., a social security number, a driver's license number, etc.), a birthdate, a gender, race, a birth place, biometrics, financial account numbers, investment holdings or activities, nationality/citizenship, school history, university or college affiliations, business or group memberships/affiliations (e.g., professional affiliations, etc.), education information (e.g., degrees, etc.), marital or blood relations (e.g., spouses, father, mother, sister, brother, cousin, etc.), etc. The information is often organized or linked by person, whereby certain information about the person forms a profile or record related to the person. It should be appreciated that the data structures 104 may include any suitable information related to the one or more persons.

It should be further appreciated that, by the scope of information, the data structures 104 may be resident in one or more different locations. For example, a segment of information for a person may be maintained by one business, while another segment of information for the person may be maintained by another business, whereby multiple different data structures 104 may be included in one or more of the regions 106 in FIG. 1 holding information for the person. In general, however, the information provider 102 is configured to interact with the data structures 104 in the different regions 106 to access the information included in the data structures 104, but generally, not to copy, move or retrieve the information included in the data structures 104 (across the different regions 106), as will be described further below.

Figure 2:
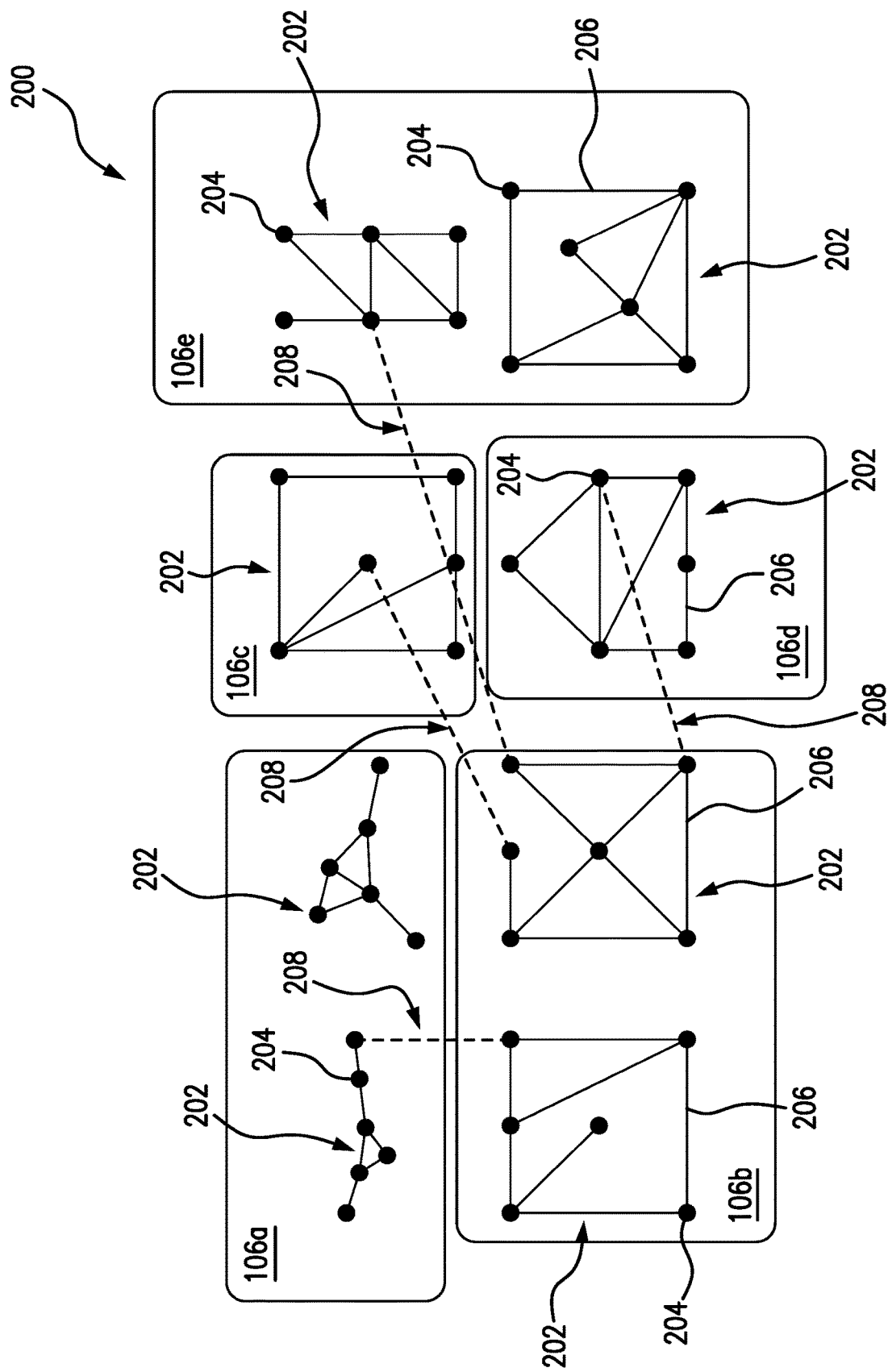
FIG. 2 illustrates an example knowledge graph of information stored in different regions.

In connection therewith, FIG. 2 illustrates an information diagram 200, which includes knowledge graphs 202 for records/information for eight different people in different ones of the regions 106 (where each person is represented by one of the knowledge graphs 202). Each node 204 of each of the graphs 202 represents information about the person (e.g., age, birthdate, residence, etc.). And, the edges 206 or sides of the graphs 202, then, are indicative of a relation of the information at the end nodes 204, in this instance. The knowledge graphs may be one dimensional, two dimensional, or more, for example, based on a number of nodes included therein, a number of links between nodes included therein, etc. For instance, a single node may be linked to multiple other nodes, etc. whereby there are multiple layers of links.

Referring again to FIG. 1, the different regions 106 may be any suitable division of location. For example, the regions 106 may each represent different countries, territories, states, provinces, cities, postal codes, etc. In general, each of the regions 106 is associated with distinct, or specific, rules and regulation associated with the storage, sharing and/or control of information within the region, as is described herein. As such, the region 106b, for example, may include a country in which it is not permitted to share PII with another country for any business purpose, or with a particular on of the other regions 106. Consequently, each of the regions 106 may be considered a jurisdiction, which is associated with information rules. The regional distribution of the information in the system 100 is further illustrated/represented in FIG. 2, which includes a designation of the different regions 106, thereby indicating in which data structures the information is included (e.g., information in region 106a is included in one of data structures 104a1 or 104a2, information in region 106b is included in data structure 104b, etc.).

That said, region 106a includes the data structure 104a1 and data structure 104a2, both of which may include information about people, for example, in the region 106a. Data structure 104a1, in this example, further includes a repository of jurisdictional rules and regulations for information in the various different regions 106. In connection therewith, the data structure 104a1 is shown as included with the information provider 102, whereby the information provider 102 has access to the jurisdictional rules and regulations, etc. However, it should be appreciated that the data structure 104a1 may be separate from the information provider 102 in other embodiments, whether physically or logically. Further, in some embodiments, one or more of the other data structures 104 may similarly include a repository of jurisdictional rules and regulations for information in the various different regions 106 and where such repository is accessible to the information provider 102 as needed.

The system 100 also includes the requestor 108, which may include any entity or person requesting access to the information included in one or more of the data structures 104. For example, the requestor 108 may include a marketing firm or other business attempting to gain/obtain information for business purposes (e.g., lending, know-your-customer (KYC) review, etc.), or the requestor 108 may include a law enforcement agency (e.g., Federal Bureau of Investigation (FBI), Interpol, etc.) attempting to gain/obtain information for investigation and/or enforcement purposes. It should be appreciated that the requestor 108, while located in region 106a in the illustrated embodiment, may be located in other regions 106 in other embodiments, whereby the location of the requestor 108, generally, may be relevant to the response from the information provider 102, etc. (e.g., with respect to jurisdictional rules and regulations for information in the region in which the requestor 108 is located, etc.).

That said, at the outset in this embodiment, the information provider 102 is configured to compile the knowledge graphs 202 of FIG. 2 for the information included in the data structures 104. In doing so, the information provider 102 is configured to graph the information as nodes 204, and as edges 206 between the nodes 204. The information provider 102, though, is configured to maintain the information in the specific data structure 104 in the specific region 106. For example, as shown in FIG. 2, the graphs 202 are region specific, whereby no edges 206 cross between regions 106 (i.e., the edges 206 do not interconnect nodes 204 in different ones of the regions 106).

The requestor 108, then, as desired, is configured to submit a request to the information provider 102 for information. The request may include, without limitation, a listing of names of one or more persons, information to be provided (e.g., questions, etc.), a reason associated with the request (e.g., lending, KYC, law enforcement, etc.), a jurisdiction in which the information resides (e.g., a state, country, national, or combinations thereof, etc.), and a time interval for which access is requested, etc. It should be appreciated that the request, in some embodiments, may also include a region/jurisdiction of the requestor 108, account information for the requestor 108 (e.g., username, password, etc.), known information about the one or more persons, etc.

The information provider 102 is configured to receive the request and to compile one or more message keys for the request. For example, when a request is directed to multiple regions, a message key per region may be compiled. The message key (or each message key) includes, for example, a case type (or reason) for the request, the jurisdiction(s) of the information requested, consent requirements (e.g., user consent required/not required, etc.), region restrictions (e.g., none, national, state, country, etc.), and time to live for the request (e.g., 24 hours, 309 days, 90 days, forever, until revoked, etc.).

In connection therewith, the data structure 104a1 associated with the information provider 102 includes a jurisdictional matrix, in which the consent requirements, restrictions, etc., are compiled for different case types per region. An example jurisdictional matrix is shown in Table 1. In compiling the message key(s), the information provider 102 is configured to access the matrix, and to compile the message key based on the matrix. For example, a message key may include: [Law enforcement+global+no consent+no restrictions+until revoked].

TABLE 1

|  | Region 106a | Region 106b | Region 106d |
| --- | --- | --- | --- |
| Lending | Consent Required: Applicant(s) Restrictions: US only No gender No zip code No affiliations Term of loan | Consent Required: Applicant(s) Restrictions: UK only 5 years No gender No postal code | Consent Required: Co-Signer(s) Restrictions: EU only No gender No postal code Term of loan |
| KYC | Consent Required: Owner Consent Restrictions: US only 1 year | Consent Required: Owner Consent Restrictions: UK only 180 days | Consent Required: Owner Consent Restrictions: EU only 90 days |
| Law Enforcement | Consent Required: None Restrictions: Global Until revoked | Consent Required: None Restrictions: UK use only 90 days | Consent Required: None Restrictions: EU use only 90 days |

The information provider 102 is configured to encrypt the message key and to transmit the compiled message key back to the requestor 108.

In turn, the requestor 108 is configured to decrypt and review the message key, and when acceptable (e.g., sufficient information access, agreement on restriction(s), etc.), to transmit the message key back to the information provider 102. It should be appreciated that the listing of names of people and/or the information to be provided by the information provider 102 to the requestor 108 may be included with the message key, here (for example, as a subsequent information request), rather than in the original request in one or more embodiments.

Upon receipt of the message key, the information provider 102 is configured to match the message key from the requestor 108 with the message key originally compiled above. When there is a match, the information provider 102 is configured to couple the different records, or more specifically, in the current embodiment, the knowledge graphs in the different jurisdictions, consistent with the restrictions and consent defined in the message key, related to the persons listed in the request (or with the message key). Notably, in performing the coupling operation on the different records, the information contained in the data structures 104 is maintained, and not copied, retrieved or moved from the one of the data structures 104 in which the information is contained. As shown in FIG. 2, for example, the information provider 102 may be configured to couple the knowledge graphs 202, as visually indicated by the dotted lines 208, based on the message key. Based on the coupling, the information provider 102 is then configured to leverage the coupling of the knowledge graphs 202 to respond to the information requested (i.e., the queries by the requestor 108) (e.g., "Do John Smith and Jane Smith have a common bank account in Region 106*d*?", etc.).

The information provider 102 is configured to determine, through the coupled ones of the data structures 104 (without moving data included therein), responses to the queries posed by the requestor 108 and to provide the information requested to the requestor 108 (e.g., generally in YES/NO format in response to the query(ies) from the requestor 108, etc.). In addition, the information provider 102 is configured to continue to respond to further requests for information, as long as the message keys are valid and/or active. That said, when a time condition associated with a message key expires, or an instruction to revoke is received (e.g., from the requestor 108, etc.), the information provider 102 revokes the message key and decouples the knowledge graphs (and more broadly, the data structures 104), whereby further requests for information will be ignored or otherwise unanswered.

While only one information provider 102 and one request are illustrated in the system 100, it should be appreciated that additional ones of these parties may be included in other system embodiments. In addition, it should be appreciated that each of the regions 106 may include multiple data structures, each with various information about people in the region, etc. Specifically, for example, it should be appreciated that other system embodiments may include multiple requestor, multiple information providers and a different number of data structures and/or regions, etc.

Figure 3:
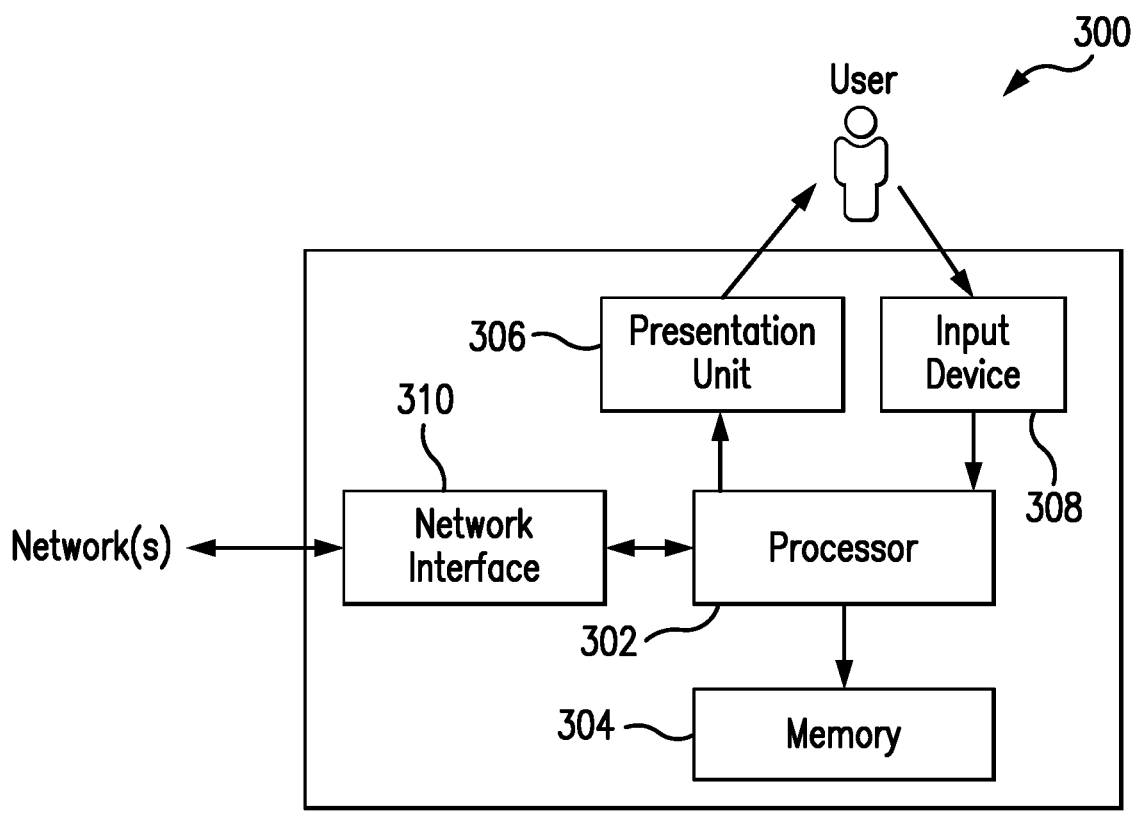
FIG. 3 is a block diagram of a computing device that may be used in the example system of FIG. 1.

FIG. 3 illustrates an example computing device 300 that can be used in the system 100. The computing device 300 may include, for example, one or more servers, workstations, personal computers, POS terminals, laptops, tablets, smartphones, PDAs, virtual devices, etc. In addition, the computing device 300 may include a single computing device, or it may include multiple computing devices located in close proximity or distributed over a geographic region as a network of computing devices, so long as the computing devices are specifically configured to function as described herein. In particular, in the example system 100 of FIG. 1, each of the information provider 102, the data structures 104 and the requestor 108 should be understood as being implemented in (and/or otherwise including or associated with) one or more computing devices generally consistent with the computing device 300. That said, the system 100 should not be considered to be limited to the computing device 300, as described below, as different computing devices and/or arrangements of computing devices may be used in other embodiments. In addition, different components and/or arrangements of components may be used in other computing devices.

Referring to FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, information about people (e.g., PII, etc.), message keys, encryption keys, restrictions, rules, and/or other types of data (and/or data structures) suitable for use as described herein.

Furthermore, in various embodiments, executable instructions may be stored in the memory 304 for execution by the processor 302 to cause the processor 302 to perform one or more of the operations described herein (e.g., one or more of the operations described in method 400, etc.), such that the memory 304 is a physical, tangible, and non-transitory computer readable storage media. Such instructions often improve the efficiencies and/or performance of the processor 302 that is performing one or more of the various operations herein (e.g., one or more of the operations of method 400, etc.), whereby the instructions (when performed by the processor 302) effectively transform the computing device 300 into a special purpose device configured to perform the unique and specific operations described herein. It should be appreciated that the memory 304 may include a variety of different memories, each implemented in one or more of the functions or processes described herein.

In addition in the example embodiment, the computing device 300 includes a presentation unit 306 that is coupled to (and is in communication with) the processor 302 (however, it should be appreciated that the computing device 300 could include output devices other than the presentation unit 306, etc.). The presentation unit 306 outputs information (e.g., verification of a message key, responses to queries, etc.), either visually or audibly, to a user of the computing device 300, etc. And, various interfaces (e.g., as defined by applications, webpages, etc.) may be displayed at computing device 300, and in particular at presentation unit 306, to display such information. The presentation unit 306 may include, without limitation, a liquid crystal display (LCD), a light-emitting diode (LED) display, an organic LED (OLED) display, an "electronic ink" display, speakers, etc. In some embodiments, presentation unit 306 may include multiple devices.

The computing device 300 also includes an input device 308 that receives inputs from the user of the device (i.e., user inputs) such as, for example, requests for information, etc. The input device 308 is coupled to (and is in communication with) the processor 302 and may include, for example, a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 306 and the input device 308.

In addition, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to/with one or more different networks, including one or more of the networks in FIG. 1. Further, in some example embodiments, the computing device 300 may include the processor 302 and one or more network interfaces (including the network interface 310) incorporated into or with the processor 302.

Figure 4:
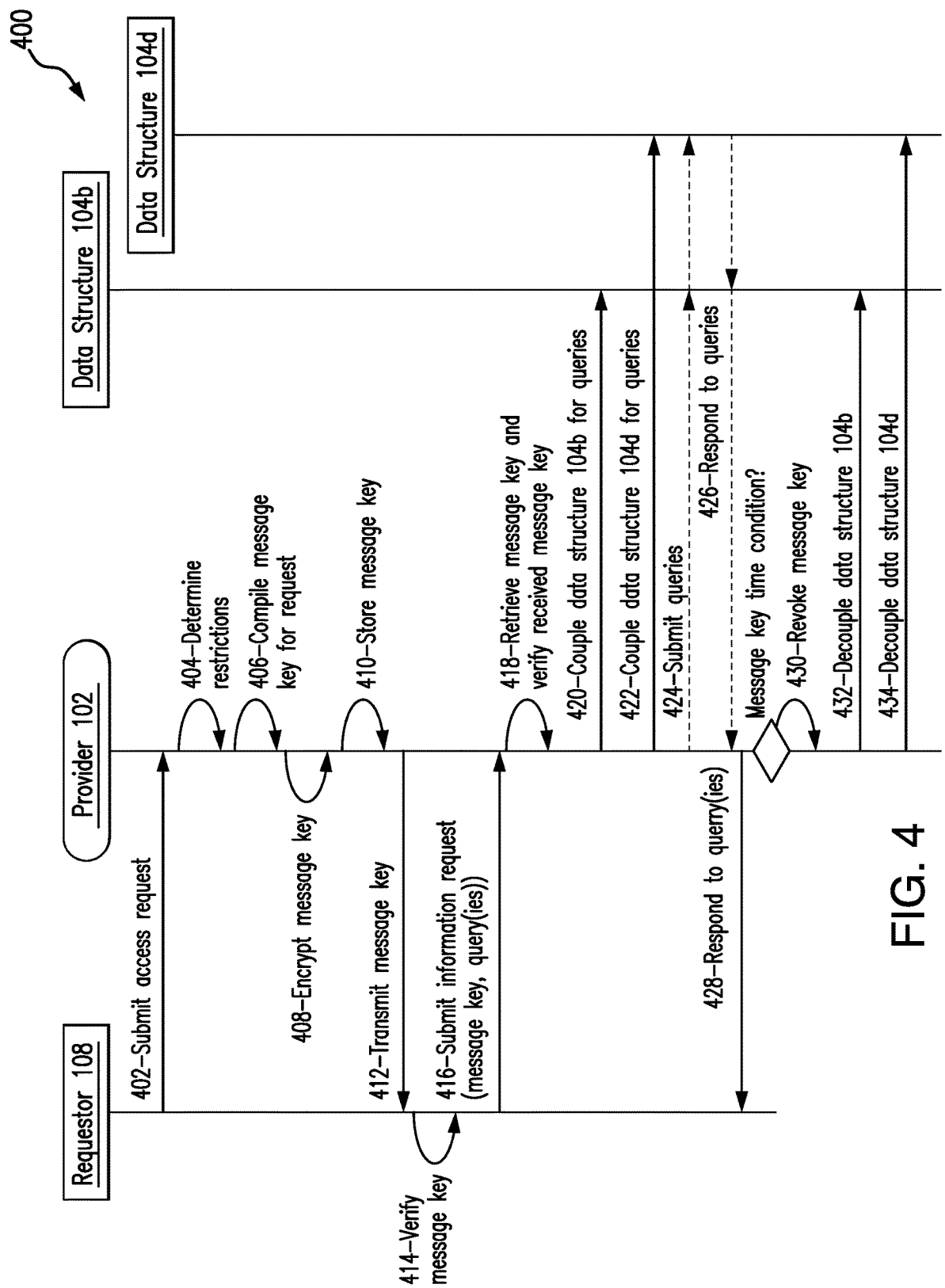
FIG. 4 illustrates an example method, which may be implemented in connection with the system of FIG. 1, for coupling and/or decoupling data structures, in one or more regions or domains, through use of message keys defining the coupling and/or decoupling.

FIG. 4 illustrates an example method 400 for use in coupling/decoupling data structures, in one or more domains, through use of message keys defining the coupling/decoupling. The example method 400 is described as implemented in the system 100, with reference to, for example, the information provider 102, and with additional reference to the computing device 300. However, the methods herein should not be understood to be limited to the system 100 or the computing device 300, as the methods may be implemented in other systems and/or computing devices. Likewise, the systems and the computing devices herein should not be understood to be limited to the example method 400.

Initially, it should be appreciated that the information provider 102 may compile knowledge graphs for information included in the respective data structures 104. For example, where a name, mailing address, email address, phone number, gender, listing of family members, citizenship, and bank information for a person A is included in the data structure 104*b*, the information provider 102 (and/or the data structure 104*b*), in this embodiment, compiles a knowledge graph for the person A, with the above information as nodes, and edges indicative of the relation to person A. It should be appreciated that, in doing so, couplings between knowledge graphs for information contained in the data structure 104*b* may be formed. It should also be appreciated that, at the outset, there is no coupling between knowledge graphs across regions.

Given the above, the requestor 108 may desire to determine certain information related to different persons, from information contained in ones of the data structures 104. To do so, the requestor 108 compiles and submits, at 402, to the information provider 102, an access request for access to certain information. The access request generally includes, without limitation, a reason for the request, indicator(s) of region(s) to which the request is directed, a time condition for access to the information (e.g., one day, 30 days, until revoked by the requestor 108, etc.), and an identity of the requestor 108 (e.g., law enforcement, lending agency, business, government agency, etc.). The access request may include further data, including, for example, a listing of names of people to which the query/request is directed and/or particular queries, etc.

In response to the access request, the information provider 102 determines, at 404, the applicable restriction(s) for the request based on, for example, the reason for the request and the region(s) to which the request is directed (e.g., all regions, at least regions 106*b*, 106*d*, etc.). Specifically, for example, the information provider 102 may access a matrix of restrictions stored in data structure 104*a*1, for example, consistent with Table 1, and identify the restriction(s) based on the specific region(s) to which the request is directed and the case type or reason for the access request. In this example, the information provider 102 is able to determine a consent restriction and a legal restriction. It should be appreciated that the information provider 102 may rely on another matrix, or on a different manner of determining the specific restriction(s) applicable to the specific access request, in other embodiments.

With that said, it should also be understood that an access request may encompass more than one region, whereby the information provider 102 determines, potentially, multiple sets of the restrictions, each applicable to a specific one of the regions to which the request is directed.

Thereafter in the method 400, the information provider 102 compiles, at 406, a message key for the request based on the determined restrictions. The message key may include, for example, a truncation of the case type, an indicator of the jurisdictions/regions, consent requirements/restrictions, legal restrictions, and time condition, etc. Table 2 illustrates an example message key for a request directed to information stored in the United States, for lending reasons for a duration of 10 days.

TABLE 2

| Message Key |
| --- |
| lending.national.userconsentrequired.nolegalrestriction.10days |

It should be appreciated that the message key of Table 2 is merely an example, and that the message key may be provided in various other or different forms or formats. For example, other data may be included in the message key, or different versions of the data than included above. In one embodiment, for example, a message key may be generated for multiple regions, while in another embodiment, a separate message key may be compiled for each region, or at least each region for which a different consent and/or legal restriction is applicable, etc. For example, where France, Germany and Italy have the same consent requirement and legal restrictions for a lending use, but Denmark has a different consent restriction, a single message key may be compiled for France, Germany and Italy, while a second message key may be compiled for Denmark.

Once compiled, the information provider 102 encrypts, at 408, the message key, via a key pair shared with the requestor 108 (e.g., via either the private key or the public key of the key pair, etc.), for example, or otherwise, to obscure the data included in the message key. Additionally, in some example embodiments, the key pairs may be supplemented with additional protections, for example, biometric protections, password protections, etc. (e.g., the encrypted message key may further be protected by a password, biometric, etc. known or available to the requestor 108; etc.). That said, it should be appreciated that the encryption (and/or additional protection) is optional, and therefore, may be omitted in other embodiments. The information provider 102 then stores, at 410, the message key in a memory associated with the information provider 102 (e.g., the memory 304, etc.) and/or the data structure 104a1, etc. And, in turn, the message key is transmitted from the information provider 102 to the requestor 108, at 412.

The requestor 108, upon receipt of the message key, decrypts the message key, as or if needed, and then verifies, at 414, the message key. In doing so, the requestor 108 may verify the message key is consistent with the original request, as far as user type, scope, region(s), and time interval, etc. In connection therewith, the requestor 108 may also be informed of the restrictions of the information to be provided (e.g., consent and legal restrictions, etc.).

Thereafter, when the message key is verified, the requestor submits, at 416, an information request for the desired information, where the information request includes the message key (encrypted in the manner described above, or not) and one or more queries for the data structures 104. In addition, in either the access request, or the information request, the requestor 108 may identify or include the names of the people to which the queries are directed, etc. In general, because the information provider 102 generally does not move PII, or other information, between regions in this example embodiment, the queries generally take the form of YES or NO queries, whereby the information provider 102 is permitted to confirm or not the queries and respond with either YES or NO. That said, in other embodiments, the queries may request specific information about a person or persons be returned.

The information provider 102 receives the information request from the requestor 108. In turn, at 418, the information provider 102 retrieves the message key originally compiled for the request from memory and verifies the received message key by comparison to the retrieved message key (e.g., verified for a match, un-verified for no match, etc.). The information provider 102 then couples (e.g., logically identifies, etc.) the applicable data structures 104 consistent with the message key, when verified. For instance, in coupling the applicable data structures 104, the information provider 102 may logically create a connection between the data structures 104, whereby assessments may be made between information in the connected data structures (and, more particularly, between the connected knowledge graphs in the data structures 104, etc.). In connection therewith, information may be passed, or not passed, via the connection depending, for example, on restrictions in the regions 106 including the data structures 104 (e.g., certain information may be passed where restrictions allow; however, where restrictions limit or restrict passing certain information, the couplings may be established to inhibit or guard against passing such information; etc.). Further, in some instances, individual knowledge graphs of the data structures 104 that share one or more common nodes (e.g., a physical address, an email address, etc.) may be coupled, whereby when a search for one piece of identity is restricted (e.g., a name search, etc.), other links (relating to unrestricted information, etc.) may be discoverable via the common nodes. This may include, for example, logically coupling or linking the knowledge graphs (e.g., nodes thereof, etc.) based on commonality of physical addresses, email addresses, account numbers, etc. at the knowledge graphs. As such, and more generally, coupling the data structures may be viewed as a process by which individual knowledge graphs can be connected or linked, for example, via nodes, etc.

Specifically, in this example, and with additional reference again to FIG. 2, the data structure 104b is coupled, at 420, to the information provider 102 and to the data structure 104a1 (in the region with the information provider 102) and the data structure 104d is coupled, at 422, to the information provider 102 (via the coupling between data structure 104b and data structure 104a1) (e.g., based on the access request and/or information request implicating regions 106b, 106d, etc.). Similarly, when the request also implicates regions 106c, 106e, the data structures 104c, 104e may also be coupled to the information provider 102, via the data structure 104b (and the coupling between the data structure 104b and the data structure 104a1). In this manner, as shown in FIG. 2, for example, links may be created between data included in the data structures 104 in the different regions 106.

As such, where the information request from the requestor 108 is related to John Smith and Jane Smith, for example, the information known about these two persons in region A, i.e., the region of the information provider 102, in part, is initially evaluated for links in the other regions. For instance, where John Smith is known, in the data structure 104a1, to have a maternal grandmother in region 106b, the information provider 102 virtually (or logically) couples John Smith, or more precisely, in this embodiment, a knowledge graph about John Smith to a knowledge graph about his grandmother in region 106b (or couples data structure 104a1 in region 106a with data structure 104b in region 106b). The information included in region 106b (e.g., in data structure 104b, etc.) relating to John Smith and/or his grandmother may then be used to respond to queries in the information request (but without actually moving or passing data from the data structure 104b in region 106b to region 106a, or vice versa). Or, where John Smith is known, in the data structure 104a1, to have an address in region 106b, the information provider 102 virtually (or logically) couples (or identifies) the data structure 104a1 with the data structure 104b (in region 106b) based on the address link. And, again, the information included in region 106b (e.g., in data structure 104b, etc.) relating to John Smith may then be used to respond to queries in the information request (but without actually moving or passing data from the data structure 104b in region 106b to region 106a, or vice versa).

In the above example, the information provider 102 initially evaluates information in the data structure 104a1 (and/or data structure 104a2), located in the region 106a of the information provider 102, for links in ones of the data structures 104 in other ones of the regions 106 relating to the information request. In other examples, though, the information provider 102 (as located in region 106a) may initially evaluate one or more of the data structures 104 in regions other than region 106a for links relating to the information request (e.g., depending on restrictions in the region 106a and/or in the other ones of the regions 106, etc.).

It should be appreciated that various other reasons may exist to couple different knowledge graphs in the same or different regions, via the method 400 or other example methods. Further, it should be appreciated that the data structures 104 may be coupled at a different part of the method 400, including, for example, prior to transmitting the message key to the requestor, at 412, and maintained consistent with the time condition, as described below.

With continued reference to FIG. 4, in this example, the information provider 102 submits, at 424, queries to the data structures 104a1, 104b and 104d. The queries, as exemplified above, may include yes or no questions, which may be region specific, and submitted to each of the data structures 104a1, 104b and 104d, as coupled in method 400. In turn, the respective data structures 104a1, 104b and 104d respond, at 426, to the queries. In this manner, data in the given data structures 104a1, 104b and 104d is used to respond to the queries, but the actual data is not transferred, passed, or otherwise accessed outside of the region of the given data structure. And, the responses received from the respective data structures 104a1, 104b and 104d are then provided to the requestor 108, at 428, in aggregate, or separately.

In one example, a query may be "Are there any common banks between Jane Smith and John Smith?", whereby the data structure 104b may review the knowledge graphs associated with John Smith and Jane Smith and respond No, while the data structure 104d may review the specific knowledge graphs and may respond Yes. The responses are then pushed to the requestor 108, for example, based on the given region (e.g., No in region 106b and Yes in region 106d, etc.). As another example, the requestor 108 may include a US law enforcement agency that suspects John Doe (a US national) as shielding money illegally offshore. And, the law enforcement agency may be looking for accounts relating to the US national in multiple countries. In connection therewith, the law enforcement agency may transmit an access request to the information provider 102, involving multiple regions as represented by, for example, Bermuda, Luxembourg, and Singapore. In response, the information provider 102 may determine appropriate restrictions associated with the requestor 108 (as a US law enforcement agency) and compile a message key (or multiple message keys, with one for each region) for the request. As this is a law enforcement case, the message key(s) may indicate that no consent of John Doe is required (see, for example, Table 1), that the message key is good in Bermuda for as long as needed, that the message key can only be valid in Luxembourg for 90 days per EU law, and that the message key is good for 365 days in Singapore. Then, in response to a corresponding information request from the requestor 108, the information provider 102 may look to connect knowledge graphs for John Doe in each country for the purposes of discovering a bank "node" associated with John Doe. A full connected international graph is built that gives law enforcement visibility to glean the information necessary to secure (or identify presence of) account information from all three countries. And, at the end of 90 days, the Luxembourg portion of the graph is disconnected (unless a new message key is generated), while at the end of 365 days the Singapore portion of the graph would be similarly disconnected.

Then in the method 400, in response, the requestor 108 may submit additional queries (not shown), where each submission is accompanied by the message key(s). The information provider 102 then submits, again at 424, the additional queries to the data structures 104a, 104b and 104d (or others, as appropriate), whereby the data structures again will generally respond, at 426. As such, the coupling to the data structures 104b and 104d are persistent, consistent with the time condition of the message key. Therefore, the couplings are maintained, and the requestor 108 may continue to submit queries until the time condition of the message key(s) is satisfied.

In connection therewith, the information provider 102 continues to monitor the time condition of the message key(s). When the time condition (e.g., one day, 30 days, 6 months, etc.) expires, the information provider 102 revokes, at 430, the message key(s), whereby the message key(s) is/are deleted from the memory (and/or the data structure 104a1). What's more, the information provider 102 decouples the data structure 104b, at 432, and decouples the data structure 104c, at 434. In connection therewith, the decoupling of the data structures 104 generally includes a logical separation of the previously coupled, grouped, linked, etc. knowledge graphs (e.g., such that the link no longer exists in any form, etc.) as well as removal of any permissions to access the knowledge graphs (by way of the expired or revoked message key(s)). As such, the prior established relationship of the data structures 104 is removed or deleted and is not recoverable and not further accessible by the message key (e.g., via a hard decoupling of the linked knowledge graphs, etc.) (e.g., the coupling no longer exists, etc.), and the message key is expired or revoked such that it is no longer usable to initiate or support queries to the data structures. In other words, the prior established coupling (or relationship) between the knowledge graphs is not permanent (e.g., it is temporary based on the underlying conditions that enabled the coupling, etc.). For example, decoupling may be viewed as a prior established coupling (or relationship) being not retained or maintained without existence of a valid use case with valid keys and valid time lines, etc.

Optionally, in method 400, it should be appreciated that when a message key indicates a specific consent being required, the information provider 102 may seek to satisfy the consent restriction. For example, upon verifying the message key from the requestor 108, at 418, the information provider 102 may submit a consent request (e.g., via SMS, email, etc.) to the person or user associated with the information, at a mobile device (not shown) associated with the person or user. The contact information for the person and/or mobile device (e.g., phone number, email address, etc.) may be identified in the data structure 104a1, for example. In at least one embodiment, the information provider 102 transmits a notification (as a request for consent) to an application installed in a mobile device of the person, where the application is associated with the information provider 102. Regardless of the manner in which the request is transmitted, the information provider 102 may wait for a response before proceeding.

In view of the above, the systems and methods herein provide for cross-domain insights through knowledge graphs. In particular, by providing a message key, which defines associated restrictions for a specific request for information, the systems and methods may permit the message key to be a basis to couple different data structures in different domains, whereby queries related to the information are submitted to an information provider, which, when permitted, responds with the responses of the different data structures. In this manner, the information provider performs as a stand-in in lieu of data consolidation between domains (rather than cross-domain consolidation of the information), and relies on the message key as the verification of the permissions and restrictions to aggregate information through the submitted queries, in response to requests from the requestors.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, from a requestor, an access request, the access request including a case type and at least one indicator of at least one domain; (b) determining, by the computing device, at least one restriction associated with the at least one domain; (c) compiling, by the computing device, a first message key specific to the access request, the first message key including the case type, the at least one indicator of the at least one domain, and the at least on restriction; (d) transmitting, by the computing device, the first message key to the requestor; (e) receiving, by the computing device, an information request including a second message key and a query specific to at least one person; (f) verifying, by the computing device, the second message key based on the first message key; (g) coupling, by the computing device, to a data structure in the at least one domain; and (h) in response to verifying the second message key: (i) submitting, by the computing device, the query from the information request to the coupled data structure; and (ii) providing, by the computing device, a response to the query from the data structure, to the requestor in response to the information request, wherein personal identifying information related to the at least one person is absent from the response.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first,"

"second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in coupling to data structures in different domains, the method comprising:
   receiving, by a computing device, from a requestor, an access request, the access request including a case type, a time to live for the request, and at least one indicator of at least one domain;
   determining, by the computing device, at least one restriction associated with the at least one domain;
   compiling, by the computing device, a first message key specific to the access request, the first message key including the case type, the time to live for the request, the at least one indicator of the at least one domain, and the at least one restriction;
   transmitting, by the computing device, the first message key to the requestor;
   receiving, by the computing device, an information request including a second message key and a query specific to at least one person;
   verifying, by the computing device, the second message key based on the first message key;
   coupling, by the computing device, to a data structure in the at least one domain, consistent with the first message key; and
   in response to verifying the second message key:
      submitting, by the computing device, the query from the information request to the coupled data structure; and
      providing, by the computing device, a response to the query from the data structure, to the requestor in response to the information request, wherein personal identifying information related to the at least one person is absent from the response.

2. The computer-implemented method of claim 1, wherein the at least one restriction includes a legal restriction and a consent restriction.

3. The computer-implemented method of claim 1, wherein the at least one indicator of the at least one domain includes multiple indicators, each specific to one of multiple domains;
   wherein coupling to the data structure in the at least one domain includes coupling to a data structure in each of the multiple domains;
   wherein submitting the query includes submitting the query to ones of the data structures in the multiple domains; and
   wherein the response includes a response from each of the ones of the data structures in the multiple domains.

4. The computer-implemented method of claim 3, wherein the data structures in the multiple domains each includes a knowledge graph including information related to the at least one person; and
   wherein coupling to the data structure includes coupling the knowledge graphs in the ones of the data structures in the multiple domains.

5. The computer-implemented method of claim 1, further comprising encrypting the first message key prior to transmitting the first message key to the requestor; and
   decrypting the second message key, prior to verifying the second message key.

6. The computer-implemented method of claim 1, further comprising revoking the message key in response to expiration of the time to live for the request, thereby decoupling the data structure in the at least one domain.

7. A system for use in coupling to data structures in different domains, the system comprising:
   at least one computing device configured to:
      receive, from a requestor, an access request including: a case type, a time to live for the request, and at least one indicator of at least one domain;
      determine at least one restriction associated with the at least one domain;
      compile a first message key specific to the access request, the first message key including the case type, the time to live for the request, the at least one indicator of the at least one domain, and the at least on restriction;
      transmit the first message key to the requestor;
      receive an information request including: a second message key and a query specific to at least one person;
      verify the second message key based on the first message key;
      couple to a data structure in the at least one domain, consistent with the first message key; and
      in response to verification of the second message key:
         submit the query from the information request to the coupled data structure; and
         provide a response to the query from the data structure, to the requestor in response to the information request, wherein personal identifying information related to the at least one person is absent from the response.

8. The system of claim 7, wherein the at least one indicator of the at least one domain includes multiple indicators, each specific to one of multiple domains;
   wherein the at least one computing device is configured, in order to couple to the data structure in the at least one domain, to couple to a data structure in each of the multiple domains;
   wherein the at least one computing device is configured, in order to submit the query, to submit the query to ones of the data structures in the multiple domains; and
   wherein the response includes a response from each of the ones of the data structures in the multiple domains.

9. The system of claim 8, wherein the data structures in the multiple domains each include a knowledge graph including information related to the at least one person; and
   wherein the at least one computing device is configured, in order to couple to the data structure, to couple the knowledge graphs in the ones of the data structures in the multiple domains.

10. The system of claim 7, wherein the at least one computing device is further configured to:
  encrypt the first message key prior to transmittal of the first message key to the requestor; and
  decrypt the second message, upon receipt from the requestor.

11. The system of claim 10, wherein the at least one computing device is further configured to revoke the message key in response to satisfaction of the time condition, whereby the data structure is decoupled from the at least one computing device.

12. The system of claim 7, wherein the at least one restriction includes a legal restriction and a consent restriction.

13. A non-transitory computer-readable storage medium comprising executable instructions, which when executed by at least one processor to couple to data structures in different domains, cause the at least one processor to:
  receive, from a requestor, an access request including: a case type, a time to live for the request, and at least one indicator of at least one domain;
  determine at least one restriction associated with the at least one domain;
  compile a first message key specific to the access request, the first message key including the case type, the time to live for the request, the at least one indicator of the at least one domain, and the at least on restriction;
  transmit the first message key to the requestor;
  receive an information request including: a second message key and a query specific to at least one person;
  verify the second message key based on the first message key;
  couple to a data structure in the at least one domain, consistent with the first message key; and
  in response to verification of the second message key:
    submit the query from the information request to the coupled data structure; and
    provide a response to the query from the data structure, to the requestor in response to the information request, wherein personal identifying information related to the at least one person is absent from the response.

14. The non-transitory computer-readable storage medium of claim 13, wherein the at least one indicator of the at least one domain includes multiple indicators, each specific to one of multiple domains;
  wherein the executable instructions, when executed by at least one processor to couple to the data structure in the at least one domain, cause the at least one processor to couple to a data structure in each of the multiple domains;
  wherein the executable instructions, when executed by at least one processor to submit the query, cause the at least one processor to submit the query to ones of the data structures in the multiple domains; and
  wherein the response includes a response from each of the ones of the data structures in the multiple domains.

15. The non-transitory computer-readable storage medium of claim 14, wherein the data structures in the multiple domains each include a knowledge graph including information related to the at least one person; and
  wherein the executable instructions, when executed by at least one processor to couple to the data structure, cause the at least one processor to couple the knowledge graphs in the ones of the data structures in the multiple domains.

16. The non-transitory computer-readable storage medium of claim 13, wherein the executable instructions, when executed by the at least one processor, further cause the at least one processor to:
  encrypt the first message key prior to transmittal of the first message key to the requestor; and
  decrypt the second message, upon receipt from the requestor.

17. The non-transitory computer-readable storage medium of claim 13, wherein the executable instructions, when executed by the at least one processor, further cause the at least one processor to revoke the message key in response to satisfaction of the time condition, whereby the data structure is decoupled from the at least one computing device.

* * * * *